US011196498B2

(12) United States Patent
Hua et al.

(10) Patent No.: US 11,196,498 B2
(45) Date of Patent: Dec. 7, 2021

(54) HIGH-PRECISION TIME SYNCHRONIZATION METHOD

(71) Applicant: Tsinghua University, Beijing (CN)

(72) Inventors: Nan Hua, Beijing (CN); Ruijie Luo, Beijing (CN); Xiaoping Zheng, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 0 days.

(21) Appl. No.: 16/945,337

(22) Filed: Jul. 31, 2020

(65) Prior Publication Data
US 2020/0366397 A1 Nov. 19, 2020

Related U.S. Application Data

(63) Continuation of application No. PCT/CN2018/095822, filed on Jul. 16, 2018.

(30) Foreign Application Priority Data

Mar. 8, 2018 (CN) .......................... 201810191208.4

(51) Int. Cl.
H04J 3/06 (2006.01)
G06F 1/12 (2006.01)

(52) U.S. Cl.
CPC .............. H04J 3/0673 (2013.01); G06F 1/12 (2013.01); H04J 3/0667 (2013.01); H04J 3/0697 (2013.01)

(58) Field of Classification Search
CPC ......... G06F 1/12; H04J 3/0667; H04J 3/0673; H04J 3/0697; H04W 24/04; H04W 56/004; H04W 56/0065
See application file for complete search history.

(56) References Cited

U.S. PATENT DOCUMENTS

2009/0040518 A1*  2/2009  Widengren ........ G01N 21/6452
                                                356/317
2011/0075685 A1*  3/2011  Xu ...................... H04L 27/2672
                                                370/503
(Continued)

FOREIGN PATENT DOCUMENTS

WO    WO-2015192696 A1 * 12/2015 ............. G16Z 99/00

OTHER PUBLICATIONS

Research on Autonomous High-precision Time Synchronization Method of UAVs Based on Side-tone Signal, Authors: Tao Liu, Yonghui Hu, Yu Hua and Meifang Wu; National Time Service; 978-1-5386-2916-1/$31.00 © 2017 IEEE (Year: 2017).*
(Continued)

Primary Examiner — Kibrom T Hailu
Assistant Examiner — Nizam U Ahmed
(74) Attorney, Agent, or Firm — Hodgson Russ LLP

(57) ABSTRACT

The present disclosure provides a high-precision time synchronization method. With the method, a traditional time synchronization protocol of a traditional IEEE 1588 network can be improved by introducing a periodic perturbation time between any two nodes in the time synchronization network, the perturbation time can be caused by changing the lengths of transmission paths or introducing clock phase perturbation due to different clock frequencies in the transistor and the receiver. With the method, the relevance of resulting errors of multiple synchronizations can be eliminated, and the perturbation can be compensated by means of statistical averaging, such that the synchronization error due to the low clock resolution of the synchronization node can be decreased. The method may realize the time synchronization at the precision of nanosecond, having significant advantages over the traditional time synchronization method based on IEEE 1588 protocol.

20 Claims, 4 Drawing Sheets

(56) References Cited

U.S. PATENT DOCUMENTS

2017/0330278 A1* 11/2017 Radulescu ............ H04L 43/106
2018/0041329 A1*  2/2018 Wang ....................... H04Q 9/04
2021/0105155 A1*  4/2021 Kons ................. H04L 25/03343

OTHER PUBLICATIONS

WIPO, ISR for PCT/CN2018/095822, Nov. 28, 2018.

* cited by examiner

HIGH-PRECISION TIME SYNCHRONIZATION METHOD

CROSS REFERENCE TO RELATED APPLICATIONS

This application is a continuation of International Application No. PCT/CN2018/095822, filed Mar. 8, 2018, which claims priority to Chinese Patent Application No. 201810191208.4, filed Mar. 8, 2018, the entire disclosures of which are incorporated herein by reference.

TECHNICAL FIELD

The present disclosure relates to a field of network and communication technologies, and more particularly, to a high-precision time synchronization method.

BACKGROUND

At present, the time synchronization at the precision of nanosecond is implemented using an accurate phase discrimination technology or the like, which requires a complicated hardware structure, causes a high cost, has disadvantages of short synchronization distance, high difficulty in networking, and further cannot be applicable to a large-scale network time synchronization system within a short time. The existing network time synchronization technology is based on digital logic and has a synchronization precision which cannot break through the clock resolution, causing that the time synchronization precision of the entire network at most reaches or even falls below submicrosecond.

Further, the existing network time synchronization is based on IEEE 1588 synchronization protocol, which uses a master-slave synchronization structure with poor robustness, such that a failure in a upstream node or link in the synchronization path will affect the synchronization precision of a downstream node. Once a clock source node is failed or attacked, the time synchronization network will break down. The capability of destruction-resistance of the time synchronization network is poor.

SUMMARY

The present disclosure aims to solve at least one of the above problems.

Accordingly, a first objective of the present disclosure is to provide a high-precision time synchronization method, which may eliminate a relevance of resulting errors of multiple synchronizations, compensate a perturbation by means of statistical averaging, decrease a synchronization error caused by a low clock resolution of a synchronization node and realize a time synchronization at the precision of nanosecond.

A second objective of the present disclosure is to provide a device.

A third objective of the present disclosure is to provide a non-transitory computer readable storage medium.

In order to achieve the above objectives, a first aspect of embodiments of the present disclosure provides a high-precision time synchronization method, including: introducing a periodic perturbation time in a transmission time between any two nodes in a time synchronization network, defining a value of the periodic perturbation time from an ith node to a jth node as a function $f_{i,j}(t)$ of time, where t indicates time and a maximum of the value of the periodic perturbation time is larger than or equal to a receiving clock period of the jth node, in which a perturbation period of the periodic perturbation time is $P_{i,j}$, and a mean of the periodic perturbation time within the perturbation period is $$E_{i,j} = \frac{1}{P_{i,j}} \int_0^{P_{i,j}} f_{i,j}(t)dt;$$

and during a time synchronization between the ith node and the jth node, recording a transmitting time $t_1^{j,i}$ of a message sent from the ith node to the jth node and a receiving time $t_2^{j,i}$ of the message received by the jth node, a transmitting time $t_3^{j,i}$ of a message sent from the jth node to the ith node and a receiving time $t_4^{j,i}$ of the message received by the ith node; for a perturbation period, calculating a mean $\overline{t_1^{j,i}}$ the transmitting time $t_1^{j,i}$, a mean $\overline{t_2^{j,i}}$ of the receiving time $t_2^{j,i}$, a mean $\overline{t_3^{j,i}}$ of the transmitting time $t_3^{j,i}$, a mean $\overline{t_4^{j,i}}$ of the receiving time $t_4^{j,i}$, and determining a time correction of the jth node with respect to the ith node according to a first formula of $\text{offset}_{j,i} = (\overline{t_2^{j,i}} - \overline{t_1^{j,i}} + \overline{t_3^{j,i}} - \overline{t_4^{j,i}} + E_{i,j} - E_{j,i})/2$; and completing the time synchronization between the jth node and the ith node based on the time correction of the jth node with respect to the ith node.

Further, the high-precision time synchronization method according to embodiments of the present disclosure has following addition technical features.

In some examples, the value of the periodic perturbation time is represented by an arithmetic progression $f_{i,j}(t)=d\cdot t$, $t\in[0,P_{i,j})$, where d represents a common difference.

In some examples, the value of the periodic perturbation time is represented by a random function $f_{i,j}(t)=\text{random}(t)$, $t\in[0,P_{i,j})$.

In some examples, the node in the time synchronization network sends pulses to each other to perform the time synchronization, and introducing the periodic perturbation time in the transmission time between any two nodes in the time synchronization network comprises: setting a transmitting clock period of the ith node as $T_s^i$, and a receiving clock period as $T_r^i$, and setting a transmitting clock period of the jth node as $T_s^j$, and a receiving clock period as $T_r^j$, in which $T_s^i$ is not equal to $T_r^j$, and $T_s^j$ is not equal to $T_r^i$, the perturbation periods of the periodic perturbation time in a two-way transmission between the ith node and the jth node are respectively a least common multiple of $T_s^i$ and $T_r^j$, and a least common multiple of $T_s^j$ and $T_r^i$.

In some examples, the method further includes converting the first formula for calculating the time correction of the jth node with respect to the ith node including: calculating a simplest integer ratio between $T_s^i$ and $T_r^j$ as $n_s^i:n_r^j=T_s^i:T_r^j$, and a simplest integer ratio between $T_s^j$ and $T_r^i$ as $n_s^j:n_r^i=T_s^j:T_r^i$; defining a time interval between a time when a kth pulse sent by the ith node arrives at the jth node and a time of a next rising edge of a receiving clock of the jth node as $e_{i,j}^k$; and converting the first formula to a second formula of:

$$\text{offset}_{j,i} = \left[\left(\overline{t_2^{j,i}} - \overline{t_1^{j,i}}\right) + \left(\overline{t_3^{j,i}} - \overline{t_4^{j,i}}\right)\right]/2 +$$
$$\left(\frac{n_r^i - 1}{2n_r^i} \cdot T_r^i + e_{i,j}^1 - \frac{T_r^i}{n_r^i} \cdot \left[\frac{n_r^i \cdot e_{i,j}^1}{T_r^i}\right]\right)/2 -$$
$$\left(\frac{n_r^j - 1}{2n_r^j} \cdot T_r^j + e_{j,i}^1 - \frac{T_r^j}{n_r^j} \cdot \left[\frac{n_r^j \cdot e_{j,i}^1}{T_r^j}\right]\right)/2.$$

In some examples, converting the first formula further includes: setting $T_s^i$, $T_s^j$, $T_r^i$, $T_r^j$ to enable $n_r^i$ and $n_r^j$ to meet $n_r^i \gg 1$ and $n_r^j \gg 1$, and simplifying the first formula to a second formula of $\text{offset}_{j,i} = [\overline{t_2^{j,i}} - \overline{t_1^{j,i}} + (\overline{t_3^{j,i}} - \overline{t_4^{j,i}})]/2 + (T_r^i - T_r^j)/4$.

In some examples, converting the first formula further includes: setting a transmitting clock period of each node in the time synchronization network as $T_s$, and a receiving clock period of each node as $T_r$, and simplifying the second formula to a third formula of $\text{offset}_{j,i} = [(\overline{t_2^{j,i}} - \overline{t_1^{j,i}}) + (\overline{t_3^{j,i}} - \overline{t_4^{j,i}})]/2$, wherein $T_s$ is not equal to $T_r$.

In some examples, setting a transmitting clock period of each node in the time synchronization network as $T_s$, and a receiving clock period of the node as $T_r$ further includes: setting the transmitting clock period $T_s$ of each node and the receiving clock period $T_r$ of the node to enable a preset upper limit $\text{Error}_{max}$ of a time synchronization error to meet $T_r/2n_r < \text{Error}_{max}$.

In some examples, the method further includes: defining a set of adjacent nodes of the jth node as $\{N_j\}$, in which $\{N_j\}$ contains n nodes and $i \in \{N_j\}$; and calculating a time correction of the jth node with respect to each node in $\{N_j\}$; and obtaining a final time correction of the jth node by a formula of:

$$\text{Offset}_j = \frac{1}{n+1} \sum_{i \in \{N_j\}} \text{offset}_{j,i} = \frac{1}{n+1} \sum_{i \in \{N_j\}} (\overline{t_2^{j,i}} - \overline{t_1^{j,i}} + \overline{t_3^{j,i}} - \overline{t_4^{j,i}} + E_{i,j} - E_{j,i})/2;$$

completing the time synchronization on the jth node based on the final time correction of the jth node.

In some examples, defining the set of adjacent nodes of the jth node includes: defining a threshold for failure waiting time as $F_{th}$, and removing the ith node from $\{N_j\}$, when a communication failure time between the ith node and the jth node is greater than $F_{th}$.

In some examples, recording a transmitting time $t_1^{j,i}$ of a message sent from the ith node to the jth node and a receiving time $t_2^{j,i}$ of the message received by the jth node further includes: the ith node sending the message carrying a time stamp and a data package signal to the jth node, the jth node deriving a data package which is received respectively by a data package analyzing module and a time stamp generating module from the data package signal, wherein the time stamp indicates the transmitting time $t_1^{j,i}$ of the message sent from the ith node, a constant delay line is set for the time stamp generating module so as to ensure that the data package analyzing module can finish an analysis on the data package within a delay time period set through the constant delay line; the data package analyzing module analyzing a head of the data package with a clock C1 having a frequency same as a transmitting frequency of the data package and a period of $T_s^i$ generating a control signal and sending the control signal to the time stamp generating module when the data package is identified as a time synchronization package; only after the control signal is received, the time stamp generating module marking a time stamp for the data package to record a time when the data package arrives at the time stamp generating module and sending the data package along with the marked time stamp to a data processor for processing, wherein a clock C2 of the time stamp generating module has a different frequency from C1 and a period of $T_r^j$, and the marked time stamp indicates the receiving time $t_2^{j,i}$ of the message received by the jth node.

With the high-precision time synchronization method according to the embodiments of the present disclosure, a relevance of resulting errors of multiple synchronizations can be eliminated, a perturbation can be compensated by means of statistical averaging, and a synchronization error caused by a low clock resolution of a synchronization node can be decreased. The method may realize the time synchronization at the precision of nanosecond, having significant advantages over the traditional time synchronization method based on IEEE 1588 protocol.

In order to achieve the above objectives, a second aspect of embodiments of the present disclosure further provides a device, including one or more processors, a memory, and one or more programs stored in the memory. When the one or more programs are executed by the one or more processors, the one or more processors are caused to implement the high-precision time synchronization method according to the above embodiments.

In order to achieve the above objectives, a third aspect of embodiments of the present disclosure further provides a non-transitory computer readable storage medium having one or more programs stored thereon. When the one or more programs are executed by a device, the device is caused to perform the high-precision time synchronization method according to the above embodiments.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
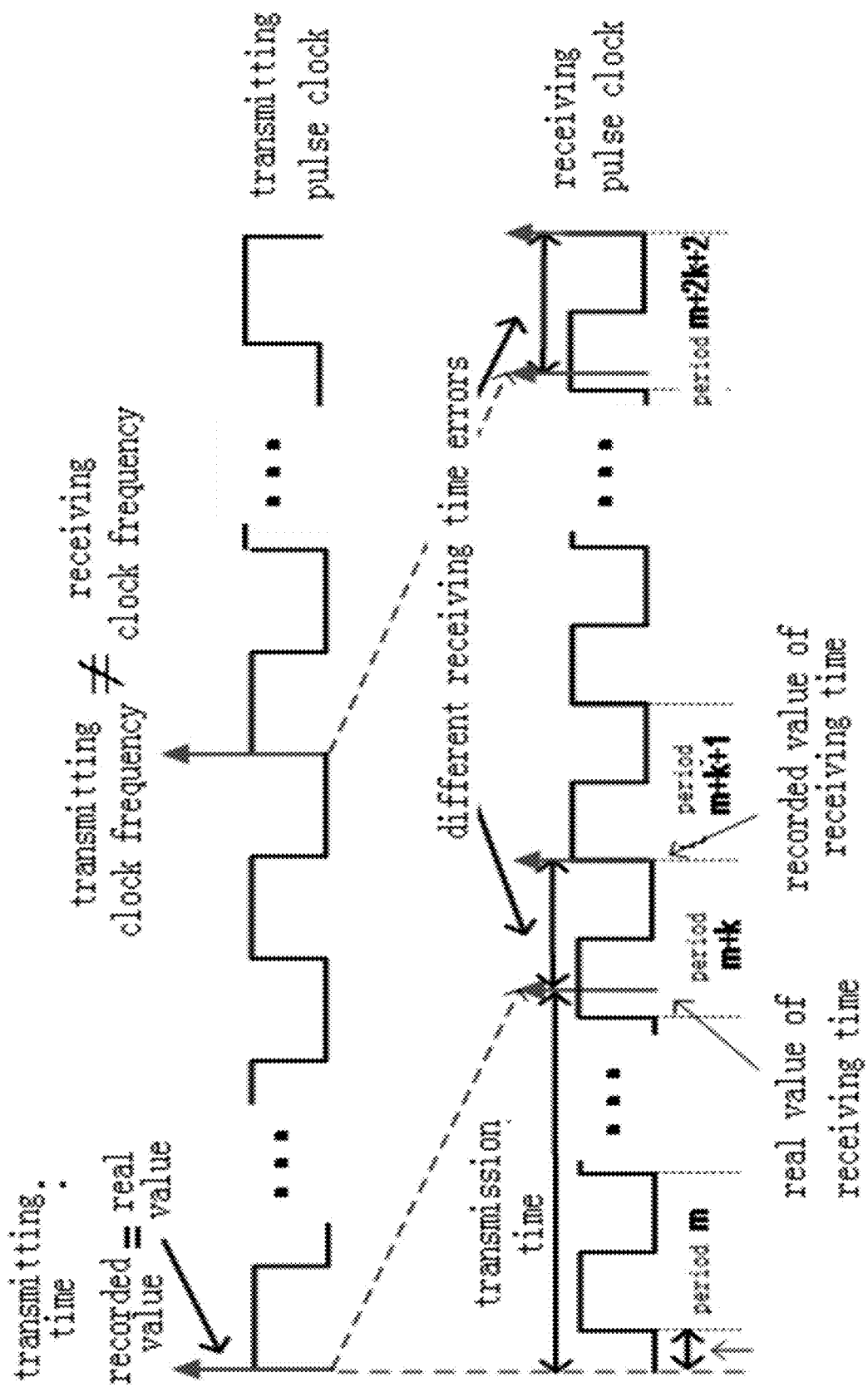
FIG. 1 is a flowchart of a high-precision time synchronization method according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

In the specification, it is to be understood that terms such as "central," "longitudinal," "lateral," "length," "width,"

"thickness," "upper," "lower," "front," "rear," "left," "right," "vertical," "horizontal," "top," "bottom," "inner," "outer," should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

A high-precision time synchronization method according to embodiments of the present disclosure will be described below with reference to the accompanying drawings.

The high-precision time synchronization method according to the embodiments of the present disclosure includes the followings.

Step S1: a predict perturbation time is introduced in a transmission time between any two nodes in a time synchronization network. A value of the periodic perturbation time from an ith node to a jth node is defined as a function $f_{i,j}(t)$ of time, where t indicates time and a maximum of the value of the periodic perturbation time is larger than or equal to a receiving clock period of the jth node. A perturbation period of the periodic perturbation time is $P_{i,j}$, and a mean of the periodic perturbation time within the perturbation period is $$E_{i,j} = \frac{1}{P_{i,j}} \int_0^{P_{i,j}} f_{i,j}(t)dt.$$

Step S2: during a time synchronization between the ith node and the jth node, the ith node and the jth node send a message carrying a time stamp to each other. A transmitting time $t_1^{j,i}$ of the message sent from the ith node, a receiving time $t_2^{j,i}$ of the message received by the jth node, a transmitting time $t_3^{j,i}$ of the message sent from the jth node, a receiving time $t_4^{j,i}$ of the message received by the ith node are recorded. For a perturbation period, a mean $\overline{t_1^{j,i}}$ the transmitting time $t_1^{j,i}$, a mean $\overline{t_2^{j,i}}$ of the receiving time $t_2^{j,i}$, a mean $\overline{t_3^{j,i}}$ of the transmitting time $t_3^{j,i}$, a mean $\overline{t_4^{j,i}}$ of the receiving time $t_4^{j,i}$ are calculated and a time correction of the jth node with respect to the ith node is determined as $offset_{j,i}=(\overline{t_2^{j,i}}-\overline{t_1^{j,i}}+\overline{t_3^{j,i}}-\overline{t_4^{j,i}}+E_{i,j}-E_{j,i})/2$.

In one embodiment of the present disclosure, the value of the periodic perturbation time is represented by an arithmetic progression $f_{i,j}(t)=d \cdot t, t\in[0,P_{i,j})$, where d represents a common difference. For example, when d=1 ns/s, $P_{i,j}$=10 s and one synchronization is performed every second, $f_{i,j}(t)$ can be expressed by an arithmetic progression from 0 ns to 9 ns, with the mean of $E_{i,j}$=4.5 ns which can be put into the formula for calculating the time correction so as to achieve precise time synchronization.

In one embodiment of the present disclosure, the value of the periodic perturbation time is represented by a random function $f_{i,j}(t)=random(t), t\in[0,P_{i,j})$. For example, when $P_{i,j}$=4 s and one synchronization is performed every second, $f_{i,j}(t)$ can be generated randomly: $f_{i,j}(0)=0$, $f_{i,j}(1)=6$, $f_{i,j}(2)=4$, $f_{i,j}(3)=2$, with the mean of $E_{i,j}$=4.5 ns which can be put into the formula for calculating the time correction so as to achieve precise time synchronization.

In one embodiment of the present disclosure, when a time synchronization node sends pulses to another node, a transmitting clock period of the ith node is recoded as $T_s^i$, and a receiving clock period of the ith node is recorded as $T_r^i$, a transmitting clock period of the jth node is recoded as $T_s^j$, and a receiving clock period of the jth node is recorded as $T_r^j$, so as to introduce the periodic perturbation time between the ith node and the jth node, the perturbation periods of the periodic perturbation time in a two-way transmission between the ith node and the jth node are respectively a least common multiple of $T_s^i$ and $T_r^j$, and a least common multiple of $T_s^j$ and $T_r^i$, and the mean of the periodic perturbation time between the ith node and the jth node and the time correction are calculated based on steps S1 and S2.

Further, in one embodiment of the present disclosure, the method further includes: determining a simplest integer ratio between $T_s^i$ and $T_r^j$ as $n_s^i:n_r^j=T_s^i:T_r^j$, and a simplest integer ratio between $T_s^j$ and $T_r^i$ as $n_s^j:n_r^i=T_s^j:T_r^i$; defining a time interval between a time when a kth pulse sent by the ith node arrives at the jth node and a time of a next rising edge of a receiving clock of the jth node as $e_{i,j}^k$; and calculating the time correction by a formula of:

$$offset_{j,i} = \left[\left(\overline{t_2^{j,i}}-\overline{t_1^{j,i}}\right)+\left(\overline{t_3^{j,i}}-\overline{t_4^{j,i}}\right)\right]/2 +$$

$$\left(\frac{n_r^i-1}{2n_r^i} \cdot T_r^i + e_{i,j}^1 - \frac{T_r^i}{n_r^i} \cdot \left[\frac{n_r^i \cdot e_{i,j}^1}{T_r^i}\right]\right)/2 -$$

$$\left(\frac{n_r^j-1}{2n_r^j} \cdot T_r^j + e_{j,i}^1 - \frac{T_r^j}{n_r^j} \cdot \left[\frac{n_r^j \cdot e_{j,i}^1}{T_r^j}\right]\right)/2.$$

In one embodiment of the present disclosure, the method further includes: setting $T_s^i$, $T_s^j$, $T_r^i$, $T_r^j$ to enable $n_r^i$ and $n_r^j$ to meet $n_r^i \gg 1$ and $n_r^j \gg 1$, and simplifying the above formula to a formula of $offset_{j,i}=[(\overline{t_2^{j,i}}-\overline{t_1^{j,i}})+(\overline{t_3^{j,i}}-\overline{t_4^{j,i}})]/2+(T_r^i-T_r^j)/4$. For example, let $T_{r1}$=10 ns, $T_{r2}$=9.9 ns to enable $n_{r1}=100\gg1, n_{r2}=99\gg1$ to be met, then the time correction can be calculated using the simplified formula.

In one embodiment of the present disclosure, the method further includes: setting a transmitting clock period of each node in the time synchronization network as $T_s$, and a receiving clock period of each node as $T_r$, and simplifying the above formula to a formula of $offset_{j,i}=[(\overline{t_2^{j,i}}-\overline{t_1^{j,i}})+(\overline{t_3^{j,i}}-\overline{t_4^{j,i}})]/2$.

In one embodiment of the present disclosure, the method further includes: defining an upper limit of a time synchronization error as $Error_{max}$, in which the upper limit meets $T_r/2n_r<Error_{max}$ by means of frequency selection. For example, when $Error_{max}$=0.1 ns, if the transmitting clock period is defined as $T_s$=10 ns, and the receiving clock period is defined as $T_r$=9.9 ns, i.e., $n_s$=100, $n_r$=99, then $T_r/2n_r$=0.05 ns<$Error_{max}$=0.1 ns.

In an embodiment of the present disclosure, the method further includes: defining a set of adjacent nodes of the jth node as $\{N_j\}$, wherein $\{N_j\}$ contains n nodes and $i\in\{N_j\}$; and calculating a time correction of the jth node with respect to each node in $\{N_j\}$; and obtaining a final time correction of the jth node by a formula of:

$$Offset_j = \frac{1}{n+1} \sum_{i \in \{N_j\}} offset_{j,i} = \frac{1}{n+1} \sum_{i \in \{N_j\}} (\overline{t_2^{j,i}} - \overline{t_1^{j,i}} + \overline{t_3^{j,i}} - \overline{t_4^{j,i}} + E_{i,j} - E_{j,i})/2.$$

For example, a node Node1 is adjacent to nodes Node2, Node3 and Node 4 (n=3). If the time corrections of Node1 with respect to Node2, Node3 and Node4 are $Offset_{1,2}=3$ ns, $Offset_{1,3}=2$ ns, $Offset_{1,4}=3$ ns, respectively, then the time correction of Node1 is $Offset_1=2$ ns.

In an embodiment of the present disclosure, the method further includes: defining a threshold for failure waiting time as $F_{th}$, and considering the ith node to be not the adjacent node of the jth node and removing the ith node from $\{N_j\}$, when a communication failure time between the ith node and the jth node is greater than $F_{th}$.

In an embodiment of the present disclosure, the method further includes: a time synchronization node sending a message carrying a time stamp to another node and a data package signal to perform the time synchronization, a receiving node deriving a data package which is received respectively by a data package analyzing module and a time stamp generating module from the data package signal, wherein a constant delay line is set for the time stamp generating module so as to ensure that the data package analyzing module can finish an analysis on the data package within a delay time period; the data package analyzing module analyzing a head of the data package with a clock C1 having a frequency the same as a transmitting frequency of the data package and a period of $T_s'$, i.e., the transmitting clock period of the time synchronization node, generating a control signal and sending the control signal to the time stamp generating module when the data package is identified as a time synchronization package; when the control signal is received, the time stamp generating module marking a time stamp for the data package to record a time when the data package arrives at the time stamp generating module and sending the data package along with the marked time stamp to a data processor for processing, wherein a clock C2 of the time stamp generating module has a different frequency from C1 and a period of $T_r'$, i.e., the receiving clock period of the receiving node; and setting the marked time stamp generated by the time stamp generating module as an arriving time of the data package, a perturbation period of the periodic perturbation time as a least common multiple of $T_s'$ and $T_r'$, and calculating the mean of the periodic perturbation time and the time correction based on steps S1 and S2.

In order to providing a comprehensive understanding of the present disclosure to those skilled in the art, the high-precision time synchronization method according to the embodiments of the present disclosure is further described below with reference to FIGS. 1-4.

FIG. 1 shows a flowchart of the high-precision time synchronization method according to an embodiment of the present disclosure. The synchronization is performed between two nodes by sending pulses. The transmitting pulse and the receiving pulse may use different clock frequencies, such that a recording error of receiving time (time difference between a real receiving time and a recorded receiving time) for each synchronization is distinct, equivalent to introducing a perturbation time in the transmission time, where a perturbation period is a least common multiple of the transmitting clock period and the receiving clock period. A mean of values of the perturbation time can be calculated within the perturbation period. By measuring the value of the perturbation time several times within one perturbation period to obtain a plurality of measured values of the perturbation time and averaging the plurality of measured values to obtain a mean of the measured values, and then compensating the perturbation time, a time correction at the precision exceeding the clock resolution can be obtained.

Figure 2:
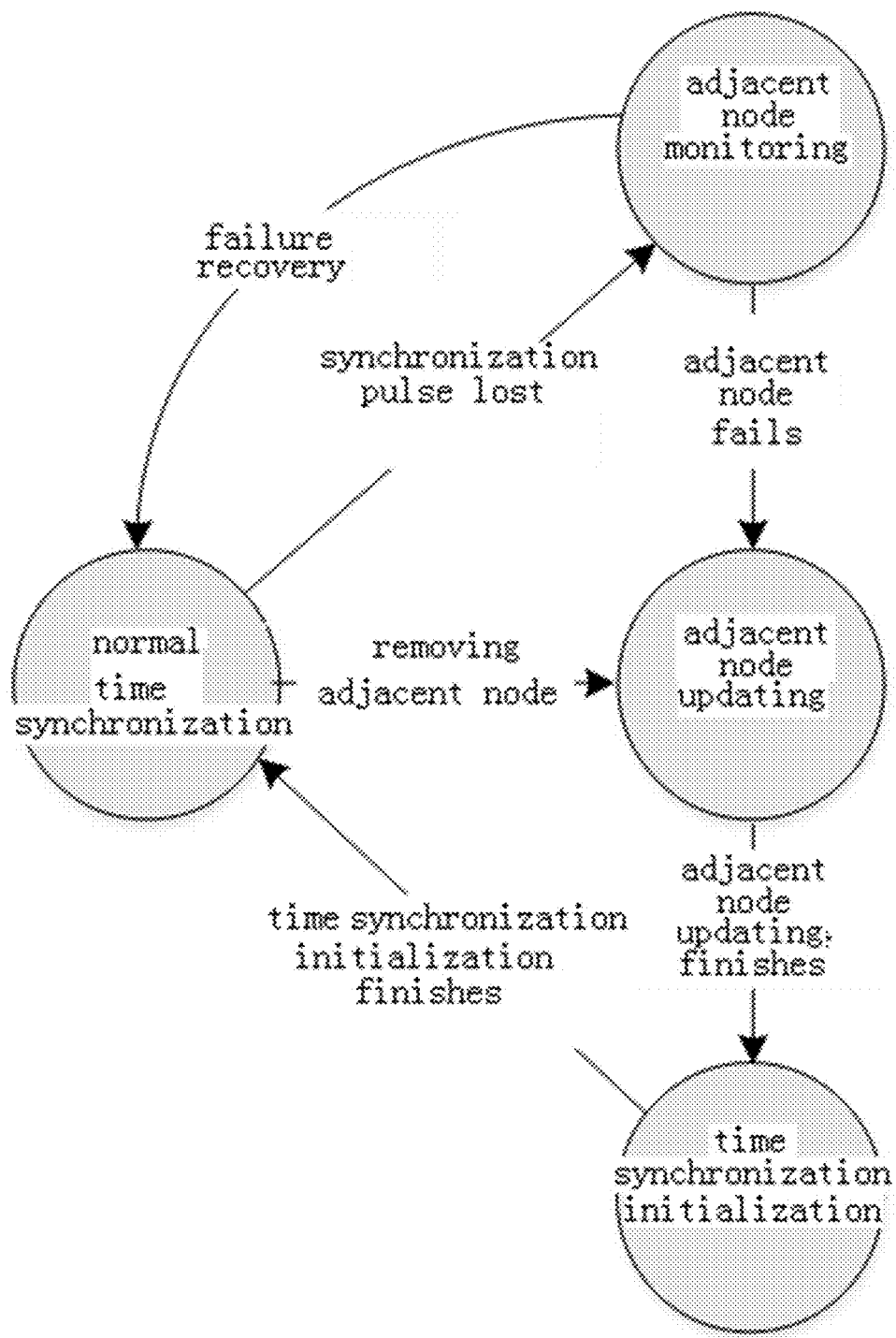
FIG. 2 is a schematic diagram of a state machine for processing failures in a high-precision time synchronization network according to an embodiment of the present disclosure.

FIG. 2 shows a state machine for processing failures in a high-precision time synchronization network. When a time synchronization node cannot receive a synchronization pulse sent from an adjacent node at expected time, the state machine is switched from a normal time synchronization state to an adjacent node monitoring state. If the node receives the synchronization pulse within a time period less than a preset threshold for failure waiting time, it is determined that the failure is overcome, and the state machine goes back to the normal time synchronization state. If the node does not receive the synchronization pulse within the time period less than the preset threshold for failure waiting time, it is determined that the adjacent node is failed, the state machine enters an adjacent node updating state and a database of adjacent nodes is updated. A network manager actively removes the adjacent node, and may also change the state of the state machine to the adjacent node updating state. After the database is updated, the state machine enters a time synchronization initializing state, and enters the normal time synchronization state after initialization. To this, the node completes a failure processing.

Figure 3:
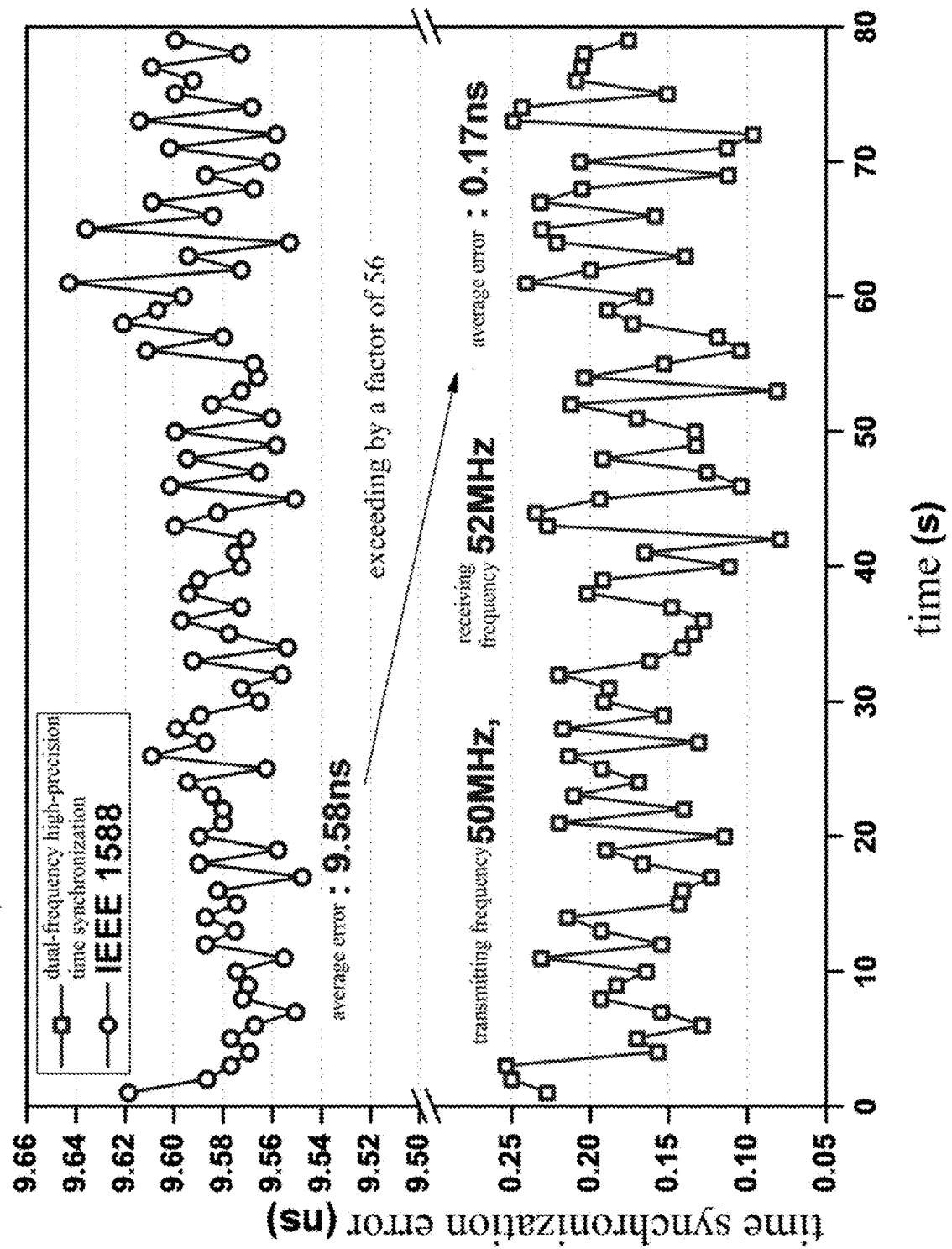
FIG. 3 is a schematic diagram showing an experimental result of time synchronization according to an embodiment of the present disclosure.

FIG. 3 shows an experimental result of the high-precision time synchronization method according to an embodiment of the present disclosure. The experimentation is based on a ring topology having four nodes. The time synchronization method according to the embodiment of the present disclosure is applied to the ring topology. The transmitting frequency and the receiving frequency of pulses are 50 MHz and 52 MHz, respectively. A clock signal of each node is input into a frequency meter for measuring the time error at the level of picosecond. The experimental result shows that, compared to the traditional time synchronization method based on IEEE 1588 protocol, the dual-frequency high-precision time synchronization method according to the embodiment of the present disclosure decreases the synchronization error from 9.58 ns to 0.17 ns, which means that the synchronization precision is improved by a factor of 56, thus realizing the nanosecond-level time synchronization.

Figure 4:
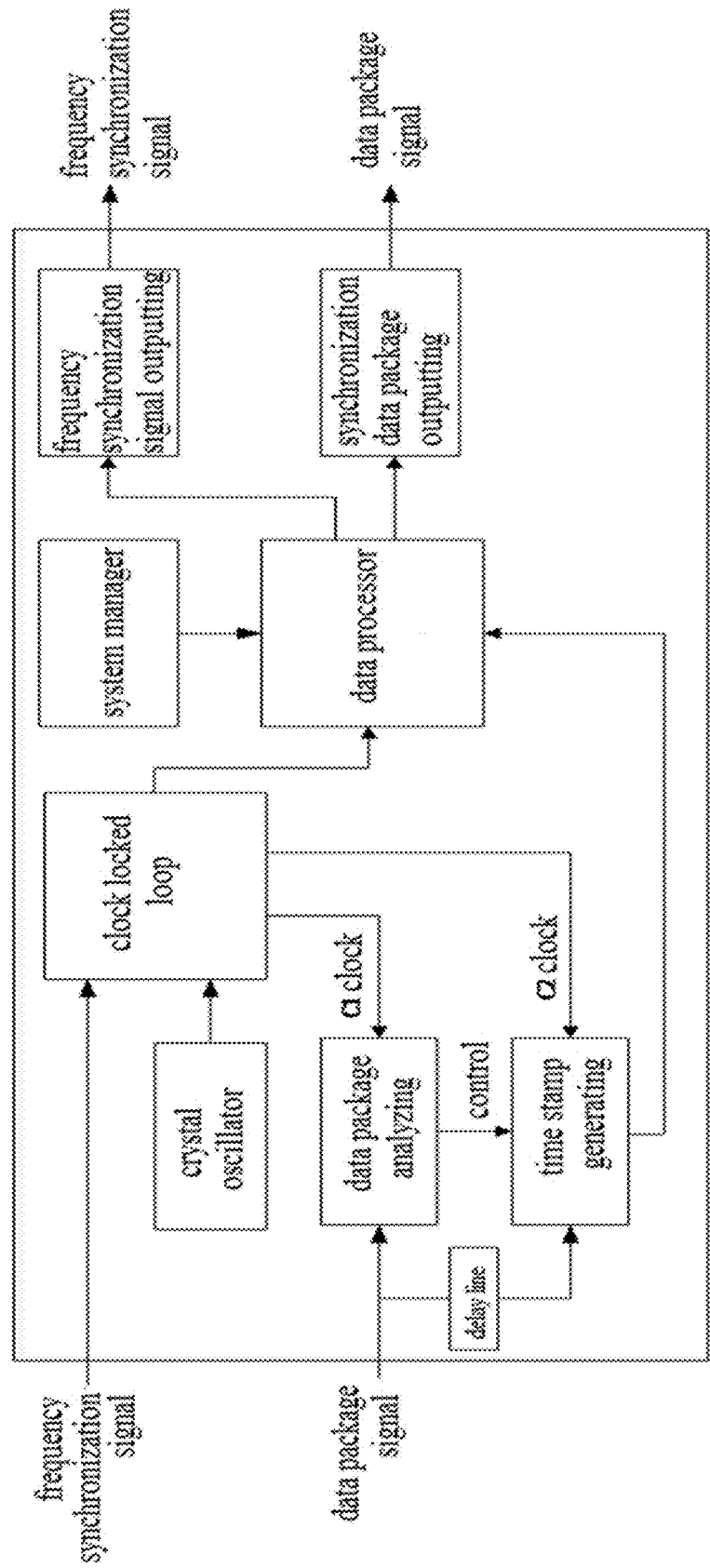
FIG. 4 is a schematic diagram showing a node structure for time synchronization with data packages according to an embodiment of the present disclosure.

FIG. 4 shows a node structure for time synchronization by means of data packages according to an embodiment of the present disclosure. A crystal oscillator signal of a node and a frequency synchronization signal from another node are input to a clock locked loop to realize the frequency synchronization of the node. The clock locked loop generates clock C1 and clock C2 and provides them to a data package analyzing module and a time stamp generating module, respectively.

Two data packages are generated from a data package signal received by the node and received by the data package analyzing module and the time stamp generating module, respectively. A constant delay line is set for the time stamp generating module to ensure that the data package analyzing module can finish the analysis of the data package within a delay time period.

The data package analyzing module uses the clock C1 which has a frequency the same as the transmitting frequency of the data package and a period $T_s$, and analyzes a head of the data package. When the data package is identified as the time synchronization package, a control signal is generated and sent to the time stamp generating module.

The time stamp generating module uses the clock C2 which has a frequency different from the clock C1 and a period of $T_r$. When the control signal sent from the data package analyzing module is received, the time stamp generating module marks a time stamp for the data package to record a time when the data package arrives at the time stamp generating module, and sends the data package with the time stamp to a data processor for processing.

The data processor sets the time stamp generated by the time stamp generating module as the arriving tine of the data package, a period of the perturbation as a least common multiple of $T_s$ and $T_r$, and calculates the mean of the perturbation and the time correction based on steps S1 and S2.

A system manager performs system processes such as node initialization and failure processing.

A frequency synchronization signal outputting module outputs the frequency synchronization signal to realize the frequency synchronization with other nodes.

A synchronization data package outputting module outputs the synchronization data package at the frequency of clock C1 to realize the time synchronization with other nodes.

In conclusion, with the high-precision time synchronization method according to the embodiment of the present disclosure, a relevance of resulting errors of multiple synchronizations can be eliminated, a perturbation can be compensated by means of statistical averaging, and a synchronization error due to a low clock resolution of a synchronization node can be decreased. The method may realize the time synchronization at the precision of nanosecond, having significant advantages over the traditional time synchronization method based on IEEE 1588 protocol.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art. It is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A time synchronization method, comprising:
introducing a periodic perturbation time in a transmission time between any two nodes in a time synchronization network, defining a value of the periodic perturbation time from an ith node to a jth node as a function $f_{i,j}(t)$ of time, where t indicates time and a maximum of the value of the periodic perturbation time is larger than or equal to a receiving clock period of the jth node, wherein a perturbation period of the periodic perturbation time is $P_{i,j}$, and a mean of the periodic perturbation time within the perturbation period is $$E_{i,j} = \frac{1}{P_{i,j}} \int_0^{P_{i,j}} f_{i,j}(t)dt;$$

and during a time synchronization between the ith node and the jth node, recording a transmitting time $t_1^{j,i}$ of a message sent from the ith node to the jth node and a receiving time $t_2^{j,i}$ of the message received by the jth node, a transmitting time $t_3^{j,i}$ of a message sent from the jth node to the ith node and a receiving time $t_4^{j,i}$ of the message received by the ith node; for a perturbation period, calculating a mean $\overline{t_1^{j,i}}$ of the transmitting time $t_1^{j,i}$, a mean $\overline{t_2^{j,i}}$ of the receiving time $t_2^{j,i}$, a mean $\overline{t_3^{j,i}}$ of the transmitting time $t_3^{j,i}$, a mean $\overline{t_4^{j,i}}$ of the receiving time $t_4^{j,i}$ and determining a time correction of the jth node with respect to the ith node according to a first formula of offset$_{j,i}$=$(\overline{t_2^{j,i}}-\overline{t_1^{j,i}}+\overline{t_3^{j,i}}-\overline{t_4^{j,i}}+E_{i,j}-E_{j,i})/2$, wherein $E_{i,j}$ represents the mean of the periodic perturbation time within the perturbation period ranging from the transmitting time $t_1^{j,i}$ to the receiving time $t_2^{j,i}$, and $E_{j,i}$ represents a mean of a periodic perturbation time within a perturbation period ranging from the transmitting time $t_3^{j,i}$ to the receiving time $t_4^{j,i}$; and completing the time synchronization between the jth node and the ith node based on the time correction of the jth node with respect to the ith node.

2. The method according to claim 1, wherein the value of the periodic perturbation time is represented by an arithmetic progression $f_{i,j}(t)=d \cdot t, t \in [0, P_{i,j})$, where d represents a common difference, wherein $t \in [0, P_{i,j})$ represents that t takes one or more values from an interval ranging from 0 to the perturbation period of the periodic perturbation time $P_{i,j}$.

3. The method according to claim 1, wherein the value of the periodic perturbation time is represented by a random function $$f_{i,j}(t) = \text{random}(t), t \in [0, P_{i,j}).$$

4. The method according to claim 1, wherein the node in the time synchronization network sends pulses to each other to perform the time synchronization, and introducing the periodic perturbation time in the transmission time between any two nodes in the time synchronization network comprises:

setting a transmitting clock period of the ith node as $T_s^i$, and a receiving clock period of the ith node as $T_r^i$, and setting a transmitting clock period of the jth node as $T_s^j$, and a receiving clock period of the jth node as $T_r^j$, wherein $T_s^i$ is not equal to $T_r^j$, and $T_s^j$ is not equal to $T_r^i$, the perturbation periods of the periodic perturbation time in a two-way transmission between the ith node and the jth node are respectively a least common multiple of $T_s^i$ and $T_r^j$, and a least common multiple of $T_s^j$ and $T_r^i$.

5. The method according to claim 4, further comprising converting the first formula for calculating the time correction of the jth node with respect to the ith node, comprising:

calculating a simplest integer ratio between $T_s^i$ and $T_r^j$ as $n_s^i:n_r^j=T_s^i:T_r^j$, and a simplest integer ratio between $T_s^j$ and $T_r^i$ as $n_s^j:n_r^i=T_s^j:T_r^i$, wherein $n_s^i$ represents a simplest integer of $T_s^i$, $n_r^j$ represents a simplest integer of $T_r^j$, $n_s^j$ represents a simplest integer of $T_s^j$, and $n_r^i$ represents a simplest integer of $T_r^i$;

defining a time interval between a time when a kth pulse sent by the ith node arrives at the jth node and a time of a next rising edge of a receiving clock of the jth node as $e_{i,j}^k$; and converting the first formula to a second formula of:

$$\text{offset}_{j,i} = \left[\left(\overline{t_2^{j,i}} - \overline{t_1^{j,i}}\right) + \left(\overline{t_3^{j,i}} - \overline{t_4^{j,i}}\right)\right]/2 +$$

-continued $$\left(\frac{n_r^i-1}{2n_r^i} \cdot T_r^i + e_{i,j}^1 - \frac{T_r^i}{n_r^i} \cdot \left[\frac{n_r^i \cdot e_{i,j}^1}{T_r^i}\right]\right)/2 -$$

$$\left(\frac{n_r^j-1}{2n_r^j} \cdot T_r^j + e_{j,i}^1 - \frac{T_r^j}{n_r^j} \cdot \left[\frac{n_r^j \cdot e_{j,i}^1}{T_r^j}\right]\right)/2,$$

wherein $e_{i,j}^1$ represents a time interval between a time when a first pulse sent by the ith node arrives at the jth node and a time of a next rising edge of a receiving clock of the jth node, and $e_{j,i}^1$ represents a time interval between a time when a first pulse sent by the jth node arrives at the ith node and a time of a next rising edge of a receiving clock of the ith node.

6. The method according to claim 5, wherein converting the first formula further comprises:

setting $T_s^i$, $T_s^j$, $T_r^i$, $T_r^j$ to enable $n_r^i$ and $n_r^j$ to meet $n_r^i \gg 1$ and $n_r^j \gg 1$, and simplifying the second formula to a third formula of $$\text{offset}_{j,i} = [(\overline{t_2^{j,i}} - \overline{t_1^{j,i}}) + (\overline{t_3^{j,i}} - \overline{t_4^{j,i}})]/2 + (T_r^i - T_r^j)/4.$$

7. The method according to claim 6, wherein converting the first formula further comprises:

setting a transmitting clock period of each node in the time synchronization network as $T_s$, and a receiving clock period of the node as $T_r$, and simplifying the third formula to a fourth formula of offset$_{j,i}$=$[(\overline{t_2^{j,i}}-\overline{t_1^{j,i}})+(\overline{t_3^{j,i}}-\overline{t_4^{j,i}})]/2$, wherein $T_s$ is not equal to $T_r$.

8. The method according to claim 7, wherein setting the transmitting clock period of each node in the time synchronization network as $T_s$, and the receiving clock period of the node as $T_r$, further comprises:

setting the transmitting clock period $T_s$ of each node and the receiving clock period $T_r$ of the node to enable a preset upper limit Error$_{max}$ of a time synchronization error to meet $T_r/2n_r <$ Error$_{max}$, wherein $n_r$ represents a simplest integer of the receiving clock period of the node $T_r$.

9. The method according to claim 1, further comprising:

defining a set of adjacent nodes of the jth node as $\{N_j\}$, wherein $\{N_j\}$ contains n nodes and $i \in \{N_j\}$, wherein $i \in \{N_j\}$ represents that the ith node belongs to the set of adjacent nodes of the jth node $\{N_j\}$; and calculating a time correction of the jth node with respect to each node in $\{N_j\}$, and obtaining a final time correction of the jth node by a formula of:

$$\text{Offset}_j = \frac{1}{n+1} \sum_{i \in \{N_j\}} \text{offset}_{j,i} = \frac{1}{n+1} \sum_{i \in \{N_j\}} \left(\overline{t_2^{j,i}} - \overline{t_1^{j,i}} + \overline{t_3^{j,i}} - \overline{t_4^{j,i}} + E_{i,j} - E_{j,i}\right)/2;$$

and completing the time synchronization on the jth node based on the final time correction of the jth node.

10. The method according to claim 9, wherein defining the set of adjacent nodes of the jth node comprises:

defining a threshold for failure waiting time as $F_{th}$ and removing the ith node from $\{N_j\}$, when a communication failure time between the ith node and the jth node is greater than $F_{th}$.

11. The method according to claim 4, wherein recording a transmitting time $t_1^{j,i}$ of a message sent from the ith node to the jth node and a receiving time $t_2^{j,i}$ of the message received by the jth node further comprises:

the ith node sending the message carrying a time stamp and a data package signal to the jth node, the jth node deriving a data package which is received respectively by a data package analyzing module and a time stamp generating module from the data package signal, wherein the time stamp indicates the transmitting time $t_1^{j,i}$ of the message sent from the ith node, a constant delay line is set for the time stamp generating module so as to ensure that the data package analyzing module can finish an analysis on the data package within a delay time period set through the constant delay line;

the data package analyzing module analyzing a head of the data package with a clock C1 having a frequency the same as a transmitting frequency of the data package and a period of $T_s^i$, generating a control signal and sending the control signal to the time stamp generating module when the data package is identified as a time synchronization package;

only after the control signal is received, the time stamp generating module marking a time stamp for the data package to record a time when the data package arrives at the time stamp generating module and sending the data package along with the marked time stamp to a data processor for processing, wherein a clock C2 of the time stamp generating module has a different frequency from C1 and a period of $T_r^j$, and the marked time stamp indicates the receiving time $t_2^{j,i}$ of the message received by the jth node.

12. A device, comprising:
one or more processors;
a memory;
one or more programs, stored in the memory, that when executed by the one or more processors, cause the one or more processors to perform the high-precision time synchronization method comprising:

introducing a periodic perturbation time in a transmission time between any two nodes in a time synchronization network, defining a value of the periodic perturbation time from an ith node to a jth node as a function $f_{i,j}(t)$ of time, where t indicates time and a maximum of the value of the periodic perturbation time is larger than or equal to a receiving clock period of the jth node, wherein a perturbation period of the periodic perturbation time is $P_{i,j}$, and a mean of the periodic perturbation time within the perturbation period is $$E_{i,j} = \frac{1}{P_{i,j}} \int_0^{P_{i,j}} f_{i,j}(t)dt;$$

and during a time synchronization between the ith node and the jth node, recording a transmitting time $t_1^{j,i}$ of a message sent from the ith node to the jth node and a receiving time $t_2^{j,i}$ of the message received by the jth node, a transmitting time $t_3^{j,i}$ of a message sent from the jth node to the ith node and a receiving time $t_4^{j,i}$ of the message received by the ith node; for a perturbation period, calculating a mean $\overline{t_1^{j,i}}$ the transmitting time $t_1^{j,i}$, a mean $\overline{t_2^{j,i}}$ of the receiving time $t_2^{j,i}$, a mean $\overline{t_3^{j,i}}$ of the transmitting time $t_3^{j,i}$, a mean $\overline{t_4^{j,i}}$ of the receiving time $t_4^{j,i}$, and determining a time correction of the jth node with respect to the ith node according to a first formula of $\text{offset}_{j,i}=(\overline{t_2^{j,i}}-\overline{t_1^{j,i}}+\overline{t_3^{j,i}}-\overline{t_4^{j,i}}+E_{i,j}-E_{j,i})/2$, wherein $E_{i,j}$ represents the mean of the periodic perturbation time within the perturbation period ranging from the transmitting time $t_1^{j,i}$ to the receiving time $t_2^{j,i}$, and $E_{j,i}$ represents a mean of a periodic perturbation time within a perturbation period ranging from the transmitting time $t_3^{j,i}$ to the receiving time $t_4^{j,i}$; and completing the time synchronization between the jth node and the ith node based on the time correction of the jth node with respect to the ith node.

13. A non-transitory computer readable storage medium, having one or more programs stored thereon, wherein when the one or more programs are executed by a device, the device is caused to perform the high-precision time synchronization method comprising:

introducing a periodic perturbation time in a transmission time between any two nodes in a time synchronization network, defining a value of the periodic perturbation time from an ith node to a jth node as a function $f_{i,j}(t)$ of time, where t indicates time and a maximum of the value of the periodic perturbation time is larger than or equal to a receiving clock period of the jth node, wherein a perturbation period of the periodic perturbation time is $P_{i,j}$, and a mean of the periodic perturbation time within the perturbation period is $$E_{i,j} = \frac{1}{P_{i,j}} \int_0^{P_{i,j}} f_{i,j}(t)dt;$$

and during a time synchronization between the ith node and the jth node, recording a transmitting time $t_1^{j,i}$ of a message sent from the ith node to the jth node and a receiving time $t_2^{j,i}$ of the message received by the jth node, a transmitting time $t_3^{j,i}$ of a message sent from the jth node to the ith node and a receiving time $t_4^{j,i}$ of the message received by the ith node; for a perturbation period, calculating a mean $\overline{t_1^{j,i}}$ the transmitting time $t_1^{j,i}$, a mean $\overline{t_2^{j,i}}$ of the receiving time $t_2^{j,i}$, a mean $\overline{t_3^{j,i}}$ of the transmitting time $t_3^{j,i}$, a mean $\overline{t_4^{j,i}}$ of the receiving time $t_4^{j,i}$, and determining a time correction of the jth node with respect to the ith node according to a first formula of $\text{offset}_{j,i}=(\overline{t_2^{j,i}}-\overline{t_1^{j,i}}+\overline{t_3^{j,i}}-\overline{t_4^{j,i}}+E_{i,j}-E_{j,i})/2$, wherein $E_{i,j}$ represents the mean of the periodic perturbation time within the perturbation period ranging from the transmitting time $t_1^{j,i}$ to the receiving time $t_2^{j,i}$ and $E_{j,i}$ represents a mean of a periodic perturbation time within a perturbation period ranging from the transmitting time $t_3^{j,i}$ to the receiving time $t_4^{j,i}$; and completing the time synchronization between the jth node and the ith node based on the time correction of the jth node with respect to the ith node.

14. The device according to claim 12, wherein the node in the time synchronization network sends pulses to each other to perform the time synchronization, and introducing the periodic perturbation time in the transmission time between any two nodes in the time synchronization network comprises:

setting a transmitting clock period of the ith node as $T_s^i$, and a receiving clock period as $T_r^i$, and setting a transmitting clock period of the jth node as $T_s^j$, and a receiving clock period as $T_r^j$, wherein $T_s^i$ is not equal to $T_r^j$, and $T_s^j$ is not equal to $T_r^i$, the perturbation periods of the periodic perturbation time in a two-way transmission between the ith node and the jth node are respectively a least common multiple of $T_s^i$ and $T_r^j$, and a least common multiple of $T_s^j$ and $T_r^i$.

15. The device according to claim 14, further comprising converting the first formula for calculating the time correction of the jth node with respect to the ith node, comprising:
calculating a simplest integer ratio between $T_s^i$ and $T_r^j$ as $n_s^i:n_r^j=T_s^i:T_r^j$, and a simplest integer ratio between $T_s^j$ and $T_r^i$ as $n_s^j:n_r^i=T_s^j:T_r^i$, wherein $n_s^i$ represents a simplest integer of $T_s^i$, $n_r^j$ represents a simplest integer of $T_r^j$, $n_s^j$ represents a simplest integer of $T_s^j$, and $n_r^i$ represents a simplest integer of $T_r^i$;
defining a time interval between a time when a kth pulse sent by the ith node arrives at the jth node and a time of a next rising edge of a receiving clock of the jth node as $e_{i,j}^k$; and
converting the first formula to a second formula of:

$$offset_{j,i} = \left[\overline{(t_2^{j,i} - t_1^{j,i})} + \overline{(t_3^{j,i} - t_4^{j,i})}\right]/2 +$$
$$\left(\frac{n_r^i - 1}{2n_r^i} \cdot T_r^i + e_{i,j}^1 - \frac{T_r^i}{n_r^i} \cdot \left[\frac{n_r^i \cdot e_{i,j}^1}{T_r^i}\right]\right)/2 -$$
$$\left(\frac{n_r^j - 1}{2n_r^j} \cdot T_r^j + e_{j,i}^1 - \frac{T_r^j}{n_r^j} \cdot \left[\frac{n_r^j \cdot e_{j,i}^1}{T_r^j}\right]\right)/2.$$

wherein $e_{i,j}^1$ represents a time interval between a time when a first pulse sent by the ith node arrives at the jth node and a time of a next rising edge of a receiving clock of the jth node, and $e_{j,i}^1$ represents a time interval between a time when a first pulse sent by the jth node arrives at the ith node and a time of a next rising edge of a receiving clock of the ith node.

16. The device according to claim 15, wherein converting the first formula further comprises:
setting $T_s^i$, $T_s^j$, $T_r^i$, $T_r^j$ to enable $n_r^i$ and $n_r^j$ to meet $n_r^{i>>1}$ and $n_r^{j>>1}$, and simplifying the second formula to a third formula of $offset_{j,i}=[\overline{(t_2^{j,i}-t_1^{j,i})}+\overline{(t_3^{j,i}-t_4^{j,i})}]/2+(T_r^i-T_r^j)/4.$ 17. The device according to claim 16, wherein converting the first formula further comprises:
setting a transmitting clock period of each node in the time synchronization network as $T_s$, and a receiving clock period of the node as $T_r$, and simplifying the third formula to a fourth formula of $offset_{j,i}=[\overline{(t_2^{j,i}-t_1^{j,i})}+\overline{(t_3^{j,i}-t_4^{j,i})}]/2$, wherein $T_s$ is not equal to $T_r$.

18. The device according to claim 17, wherein setting the transmitting clock period of each node in the time synchronization network as $T_s$, and the receiving clock period of the node as $T_r$, further comprises:
setting the transmitting clock period $T_s$ of each node and the receiving clock period $T_r$ of the node to enable a preset upper limit $Error_{max}$ of a time synchronization error to meet $T_r/2n_r<Error_{max}$, wherein $n_r$ represents a simplest integer of the receiving clock period of the node $T_r$.

19. The device according to claim 12, further comprising:
defining a set of adjacent nodes of the jth node as $\{N_j\}$, wherein $\{N_j\}$ contains n nodes and $i\in\{N_j\}$ wherein $i\in\{N_j\}$ represents that the ith node belongs to the set of adjacent nodes of the jth node $\{N_j\}$; and
calculating a time correction of the jth node with respect to each node in $\{N_j\}$, and obtaining a final time correction of the jth node by a formula of:

$$Offset_j = \frac{1}{n+1}\sum_{i\in\{N_j\}} offset_{j,i} = \frac{1}{n+1}\sum_{i\in\{N_j\}}(\overline{t_2^{j,i}} - \overline{t_1^{j,i}} + \overline{t_3^{j,i}} - \overline{t_4^{j,i}} + E_{i,j} - E_{j,i})/2;$$

and
completing the time synchronization on the jth node based on the final time correction of the jth node.

20. The device according to claim 14, wherein recording a transmitting time $t_1^{j,i}$ of a message sent from the ith node to the jth node and a receiving time $t_2^{j,i}$ of the message received by the jth node further comprises:
the ith node sending the message carrying a time stamp and a data package signal to the jth node, the jth node deriving a data package which is received respectively by a data package analyzing module and a time stamp generating module from the data package signal, wherein the time stamp indicates the transmitting time $t_1^{j,i}$ of the message sent from the ith node, a constant delay line is set for the time stamp generating module so as to ensure that the data package analyzing module can finish an analysis on the data package within a delay time period set through the constant delay line;
the data package analyzing module analyzing a head of the data package with a clock C1 having a frequency the same as a transmitting frequency of the data package and a period of $T_s^i$, generating a control signal and sending the control signal to the time stamp generating module when the data package is identified as a time synchronization package;
only after the control signal is received, the time stamp generating module marking a time stamp for the data package to record a time when the data package arrives at the time stamp generating module and sending the data package along with the marked time stamp to a data processor for processing, wherein a clock C2 of the time stamp generating module has a different frequency from C1 and a period of $T_r^j$, and the marked time stamp indicates the receiving time $t_2^{j,i}$ of the message received by the jth node.

* * * * *